(12) United States Patent
Ishida et al.

(10) Patent No.: US 7,847,475 B2
(45) Date of Patent: Dec. 7, 2010

(54) ELECTRON EMITTER APPARATUS, A FABRICATION PROCESS FOR THE SAME AND A DEVICE UTILISING THE SAME

(75) Inventors: Takehisa Ishida, Singapore (SG); Wei Beng Ng, Singapore (SG)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 12/037,468

(22) Filed: Feb. 26, 2008

(65) Prior Publication Data
US 2008/0291366 A1 Nov. 27, 2008

(30) Foreign Application Priority Data
May 25, 2007 (SG) .............................. 200703694-0

(51) Int. Cl.
*H01J 63/04* (2006.01)
(52) U.S. Cl. ........................................ 313/495; 349/69
(58) Field of Classification Search ................ 313/483, 313/495–498, 309–311; 349/69
See application file for complete search history.

(56) References Cited

U.S. PATENT DOCUMENTS 5,646,702 A * 7/1997 Akinwande et al. .......... 349/69
6,455,989 B1 * 9/2002 Nakada et al. ............... 313/309
6,741,019 B1    5/2004 Filas et al.
7,157,848 B2   1/2007 Tang et al.
2007/0275627 A1  11/2007 Jung et al.

FOREIGN PATENT DOCUMENTS

JP    2002-100280       4/2002
WO    WO 03/087707 A2   10/2003

OTHER PUBLICATIONS

Jean-Marc Bonard, et al., "Tuning the Field Emission Properties of Patterned Carbon Nanotube Films", Advanced Materials, vol. 13, No. 3, February 5, 2001, pp. 184-188.

* cited by examiner

*Primary Examiner*—Karabi Guharay
*Assistant Examiner*—Brenitra M Lee
(74) *Attorney, Agent, or Firm*—Oblon, Spivak, McClelland, Maier & Neustadt, L.L.P.

(57) ABSTRACT

A field effect electron emitting apparatus is prepared by depositing a plurality of nano-wires 216 onto a substrate 200 having a cathode layer 214. The deposition occurs by suspending the nano-wires 216 in a plating solution, and plating the substrate with a metal layer 202, thereby entrapping the nano-wires. The nano-wires 216 are composed of an electrically-conductive magnetic material, and the deposition process is carried out in the presence of a magnetic field perpendicular to the substrate 200 so that the nano-wires 216 are aligned by the field.

13 Claims, 10 Drawing Sheets

Figure 1

PRIOR ART

PRIOR ART

ELECTRON EMITTER APPARATUS, A FABRICATION PROCESS FOR THE SAME AND A DEVICE UTILISING THE SAME

FIELD OF THE INVENTION

The present invention relates to an electron emitter which can be utilized for a Field Emission Display device (FED), backlight for a liquid crystal display (LCD) or any other devices which require electron emission.

BACKGROUND

Recently Flat Panel Displays (FPDs) have become popular due to their smaller footprint and larger flatter screen compared to conventional technology. Liquid Crystal Displays (LCD) are replacing Cathode Ray Tubes (CRT) in many domestic applications. However, most LCDs have the disadvantage of a low contrast ratio (5000:1) compared to conventional CRT technology (1,000,000:1). To improve the contrast ratio of an LCD, multi-segment operation of a backlight is being studied actively by many researchers. Multi-segment operation is a method in which a segment of the display which is located in a bright portion of the picture is illuminated more brightly and other segments which are located in darker portions of the picture are less illuminated. The intensity of each segment is controlled according to the displayed picture. The smaller the size of the segments the better the fidelity of the display. Light Emitting Diodes (LED) are usually used as the light sources of a multi-segment operated backlight. For example, it is known for 400 LEDs to be aligned in a 20×20 matrix on the backlight panel. This LED array is divided into 25 segments so that each segment has 16 (=4×4) LEDs. The image which is supposed to be displayed by the LCD panel is analysed in advance and the intensity of each segment is determined so as to maximize the contrast ratio of displayed picture. The LED backlight usually creates a white light from 3 kinds of LEDs, namely Red, Blue and Green, so it is difficult to make the size of the segment too small. If the area of a segment is too small, appropriate white light cannot be obtained because 3 colours are not mixed well.

An alternative technology to LCD is a Field Emission Display (FED). A typical FED incorporates a large array of fine metal tips or carbon nano-tubes (CNT), which emit electrons through a process known as field emission. Since a FED works based on a similar principle to a CRT, namely using an electron emitter and a phosphor, it gives a sufficiently high contrast ratio. However, the fabrication of so-called Spindt-type emitters, which are utilized for most FED systems, requires complex processes and increases the cost of the panel. Synthesis of CNT is also costly because it requires expensive equipment. These are the major reasons why FED cannot play a main role in the FPD industry in spite of its potential to achieve a high contrast ratio.

It would therefore be desirable to provide a backlight for LCD which has a lot of small segments which can each be operated independently, or an electron emitter array for a FED which enables low production cost.

SUMMARY OF THE INVENTION

It is therefore an objective of the invention to provide a new and useful electron emitter display.

In general terms, the present invention proposes in a first aspect that in a field effect electron emitting apparatus using nano-wire electron emitters, each nano-wire is made of a magnetic material.

This concept provides the advantage that if a magnetic field is applied to the wires perpendicular to the substrate during the fabrication process of the electron emitting apparatus, the magnetic field may align the nano-wires perpendicular to a substrate. Note that conventionally Molybdenum (Mo) is used to form an emitter in Spindt-type FEDs and carbon is used in CNT-type FEDs. Neither is a magnetic material.

A second aspect of the invention proposes in general terms a fabrication process for a field effect electron emitting apparatus which includes a step of attaching nano-wires to a substrate in the presence of a magnetic field perpendicular to the substrate, and that the nano-wires are made of a magnetic material, such that they are aligned by the field.

Either aspect of the invention makes it easier to control the density and the orientation of the nano-wires on the substrate, so that the fabricated electron emitter has a lower threshold voltage of electron emission.

Typically, the nano-wires are attached at the same time that a metallic material is deposited on the substrate using a plating solution, by an electrochemical or non-electric plating process. The magnetic nano-wires are dispersed in the plating solution, aligned with the magnetic field, so they are incorporated in the electrochemically or chemically deposited metallic film maintaining their orientation almost perpendicular to the substrate. Thus, the fixing of the nano-wires is effected by a simple process such as electrochemical or non-electric plating which reduces the production cost relative to known techniques.

The material of the nano-wires may be an electrically conductive material. However, it would also be possible to form them from a non-electrically conductive magnetic material (such as a metal oxide), a non-electrically conductive magnetic material and subsequently coat them with conductive material, or an electrically conductive magnetic material and subsequently coat them with another electrically conductive or non-conductive material.

Some embodiments of the invention are electron emitters which can be divided into small segments and operated independently by patterning cathodes and gate electrodes. Such an emitter is particularly useful as a multi-segmented backlight for a LCD or FED panel.

BRIEF DESCRIPTION OF THE DRAWINGS

Exemplary embodiments of the invention will now be described, with reference to the following figures, in which.

DETAILED DESCRIPTION

Figure 1:
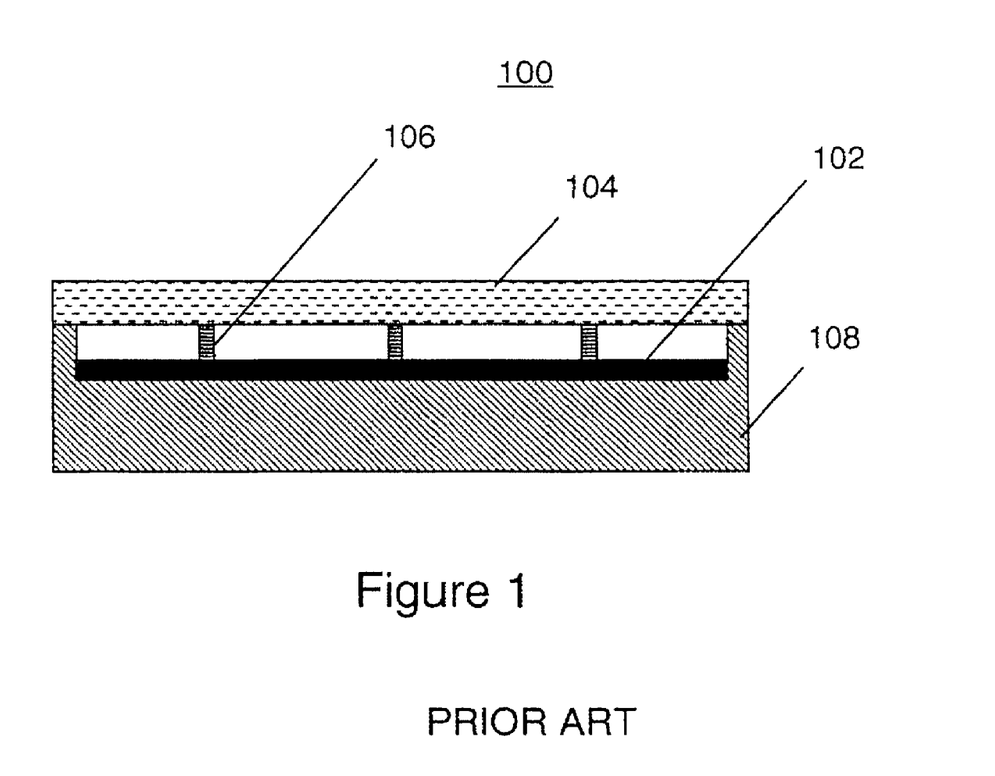
FIG. 1 is a cross sectional diagram of a known Field Emission Display (FED) or multi-segmented backlight for a LCD.

Referring to FIG. 1, the principle of a Field Emission Display (FED) or multi-segmented backlight for LCD 100 is shown, including an emitter array 102 and a phosphor coated screen 104 in a housing 108. The phosphor coated screen 104 is parallel to the emitter array 102 and spaced apart from it by a series of spacers 106. The cavity surrounded by the housing 108 and the screen 104 is maintained under vacuum. The phosphor coated screen 104 consists of a glass face plate, a phosphor layer and an anode layer. The accelerated electrons from the emitter array 102 collide against the phosphor coated screen 104 and fluorescent light is generated.

Figure 2:
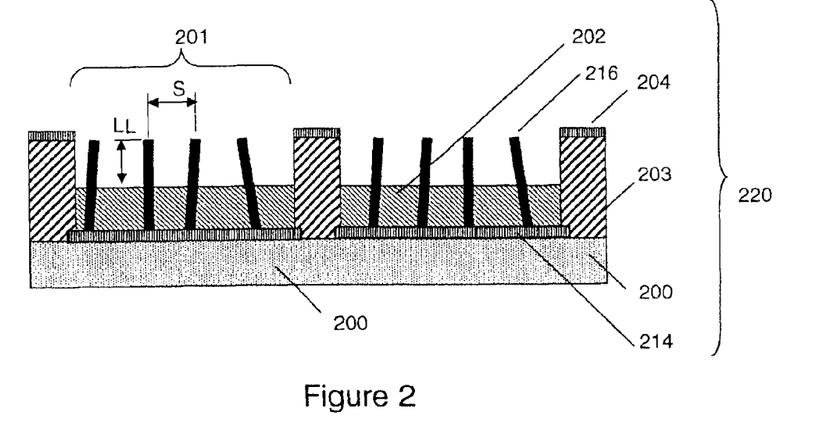
FIG. 2 is a cross section of an electron emitter array which is an embodiment of the invention and which can be employed in the structure of FIG. 1.
Figure 3:
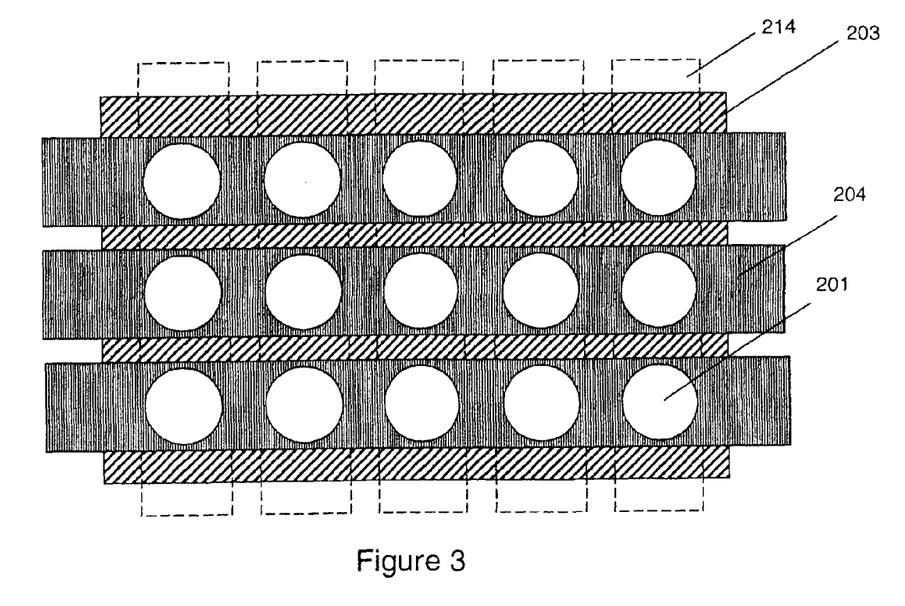
FIG. 3 is a top view of the emitter array in FIG. 2.

A first embodiment of the invention, illustrated in FIG. 2, is a novel electron emitter assembly 220 which may be used to replace the emitter array 102 in FIG. 1. The electron emitter assembly 220 includes a substrate 200, cathode 214, insulation layer 203, a metal layer 202, nano-wire electron emitters 216 and gate electrode 204. In the fabrication process, the cathodes 214 are deposited on the substrate 200 as a series of parallel strips on the substrate 200. The insulation layer 203 is then applied, defining apertures 201 extending over the cathodes 214. Then a series of gate electrodes 204 are deposited on the insulation layer 203 so that they extend perpendicular to the cathodes 214 as shown in FIG. 3. Thus an electrode assembly 220 is fabricated. Thereafter, the nano-wires 216 made of a magnetic material are attached on the cathode layer 214, together with an electroplated metal layer 202. Note that the metal layer 202 need not be contiguous: instead it is partitioned by the bodies of insulating material 203, so as to include a plurality of regions overlying different ones of the cathodes 214. As shown in FIG. 2, the upper tips of the nano-wires 216 are substantially co-planar with the gate electrodes 204.

Figure 4:
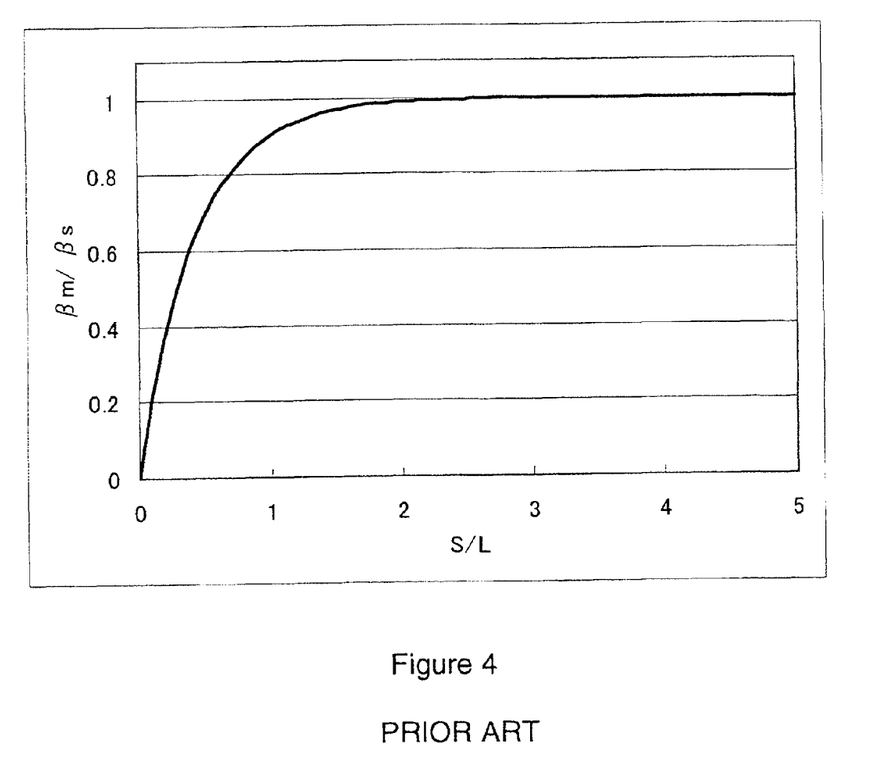
FIG. 4 is the calculated field emission behavior of an electron emitter.

It is well-known that the ratio S/L, where S is the separation between nano-wires and L is the length of exposed nano-wires, affects electron emission properties. For example, Jean-Marc Bonard et al. [1] clarified that the relationship between S/L and $\beta_m/\beta_s$ can be expressed by the following equation, $$\beta_m/\beta_s = 1 - \exp(-2.3172 S/L), \quad (1)$$

where $\beta_m$ is a field enhancement factor for a series of nano-wires which are uniformly bristled on a plane and $\delta_s$ is a field enhancement factor for a single nano-wire. This expression is plotted in FIG. 4. The field enhancement factor $\beta$ is defined by eqn. (2), $$F = \beta E, \quad (2)$$

where F is the electric field at the tip of a nano-wire and E is the applied external electric field. As FIG. 4 shows, $\beta_m$ is very much smaller than $\beta_s$ when S/L is smaller than 1. From this point of view, the thickness of metal layer 202, the length of nano-wire 216 and density of nano-wires should be determined so that S/L becomes larger than 1.

Figure 5:
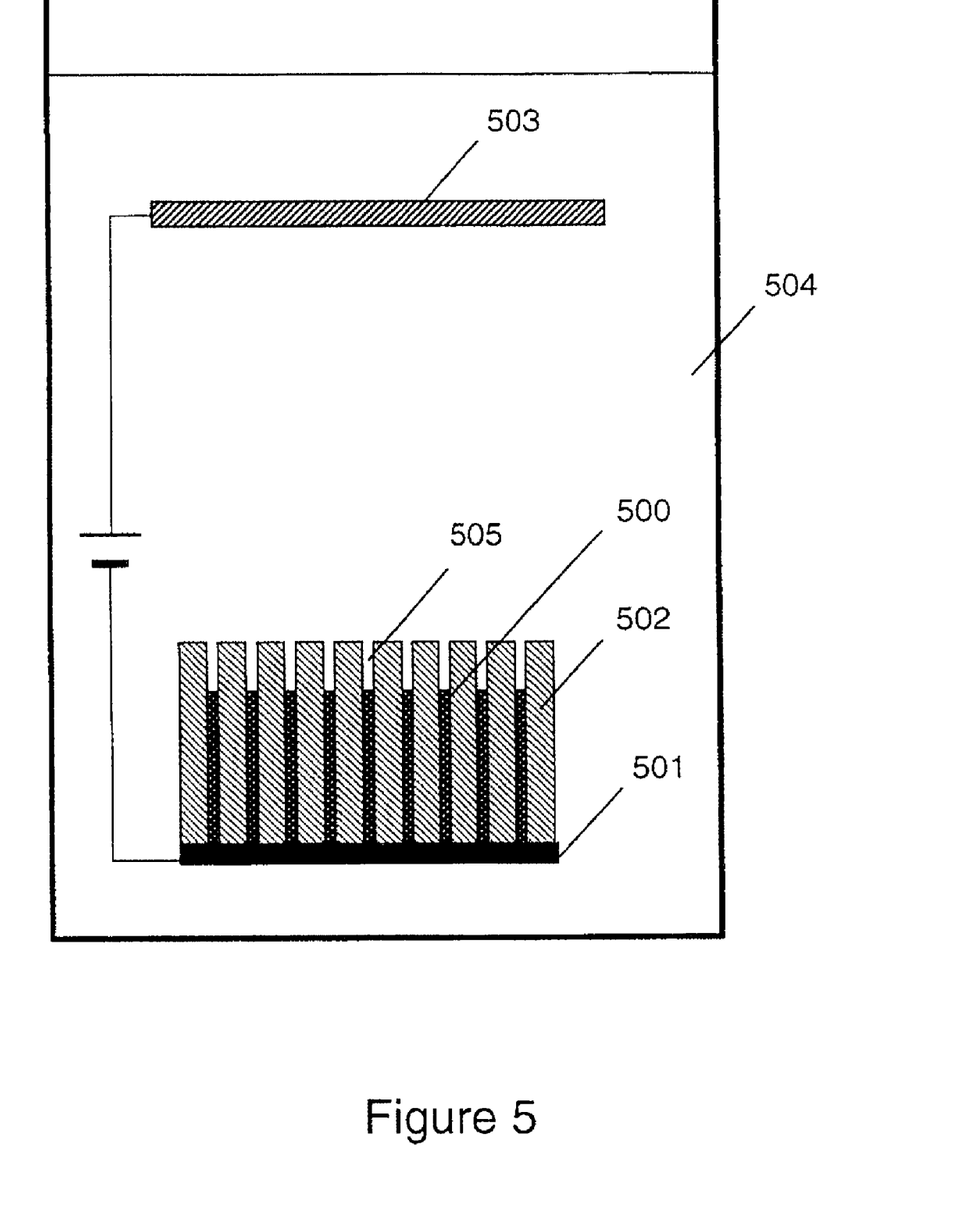
FIG. 5 is a process for fabricating magnetic nano-wires, which can be used as a first step of a process to fabricate a device according to the embodiment of FIGS. 2-3.
Figure 6:
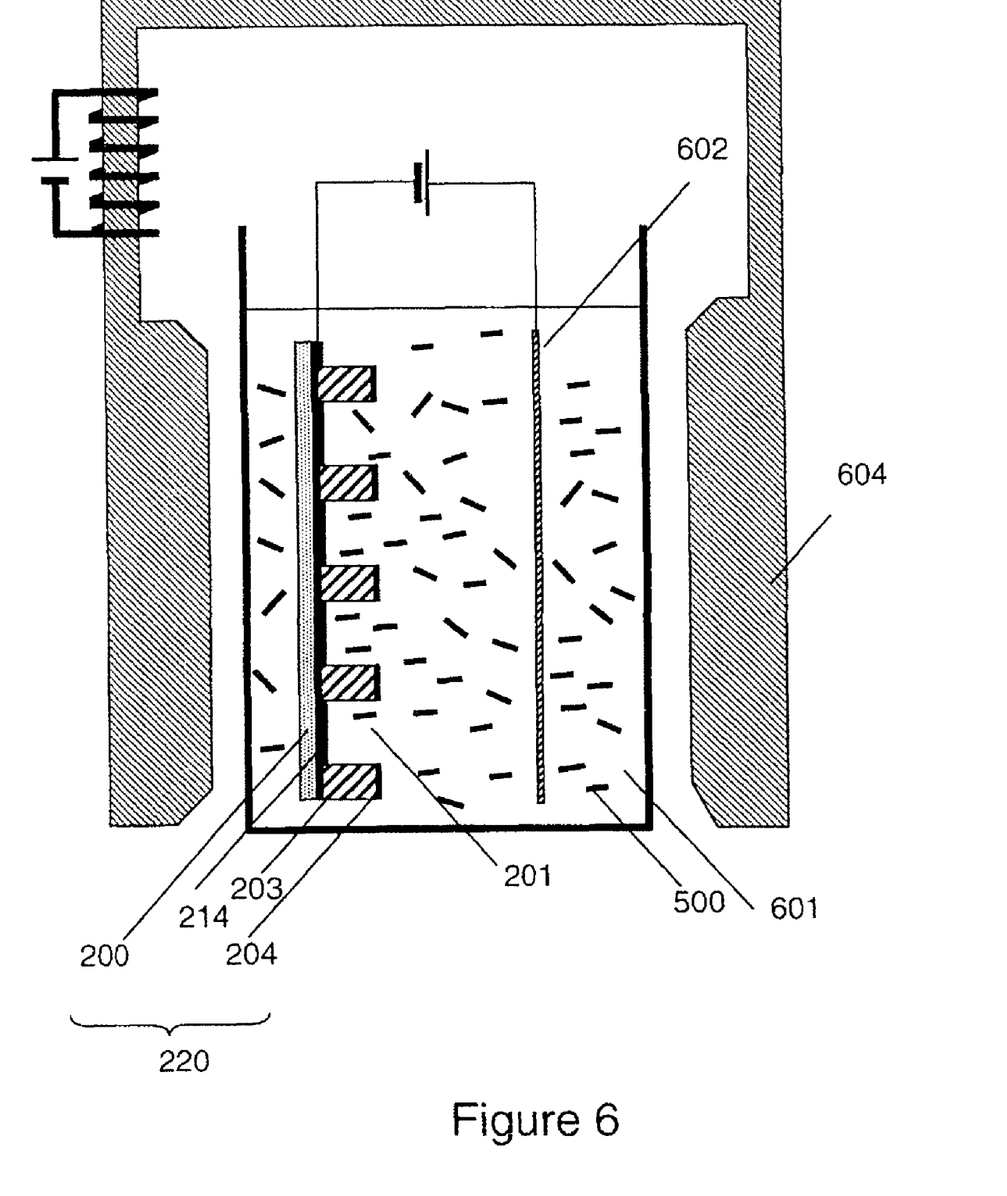
FIG. 6 is electrochemical plating process of this invention.

Referring to FIGS. 5-6, a first fabrication process which is an embodiment of the present invention is explained in detail. Firstly, nano-wires made of a magnetic material such as Ni, Co, Fe or any other metal, alloy or its oxide which shows soft or hard magnetic properties are formed (FIG. 5). It is convenient to use a sheet of Anodized Aluminum Oxide (AAO) 502 as a template for the nano-wires. For example, Ni nano-wires can be electroplated in the pores of an AAO template. In one specific example, a 200 nm thick Cu layer 501 is deposited as a seed layer on one side of a 50 μm thick AAO sheet 502 which has through-holes 505 which are 20 nm in diameter 505. By applying current between the Cu seed layer 501 and a counter electrode 503 made of a material such as Pt in a plating solution 504, Ni nano-wires 500 having a diameter of 20 nm and a length of 10 μm, for example, are obtained. The diameter and length are adjustable by changing the pore size of AAO template and a plating time. For the plating solution, the following mixture can be used, namely, 240 g/L of $NiSO_4$-$6H_2O$, 45 g/L of $NiCl_2$-$6H_2O$ and 35 g/L of $H_3BO_3$. After plating, the AAO template is removed by etching in NaOH solution. The Cu seed layer can be removed by treating the result with $(NH_4)_2S_2O_8$ or $FeCl_2$ solution. Thus only individual Ni nano-wires remain. Typically, the length of the nano-wires is within the range from several micrometers to several dozens micrometers. In this document the term nano-wire is used to mean an elongate conductor less than 1 micron in diameter, and preferably less than 500 nm in diameter. Experiments carried out by the inventors indicate that metal nano-wire less than 200 nm in diameter gives a reasonable threshold voltage.

Figure 7:
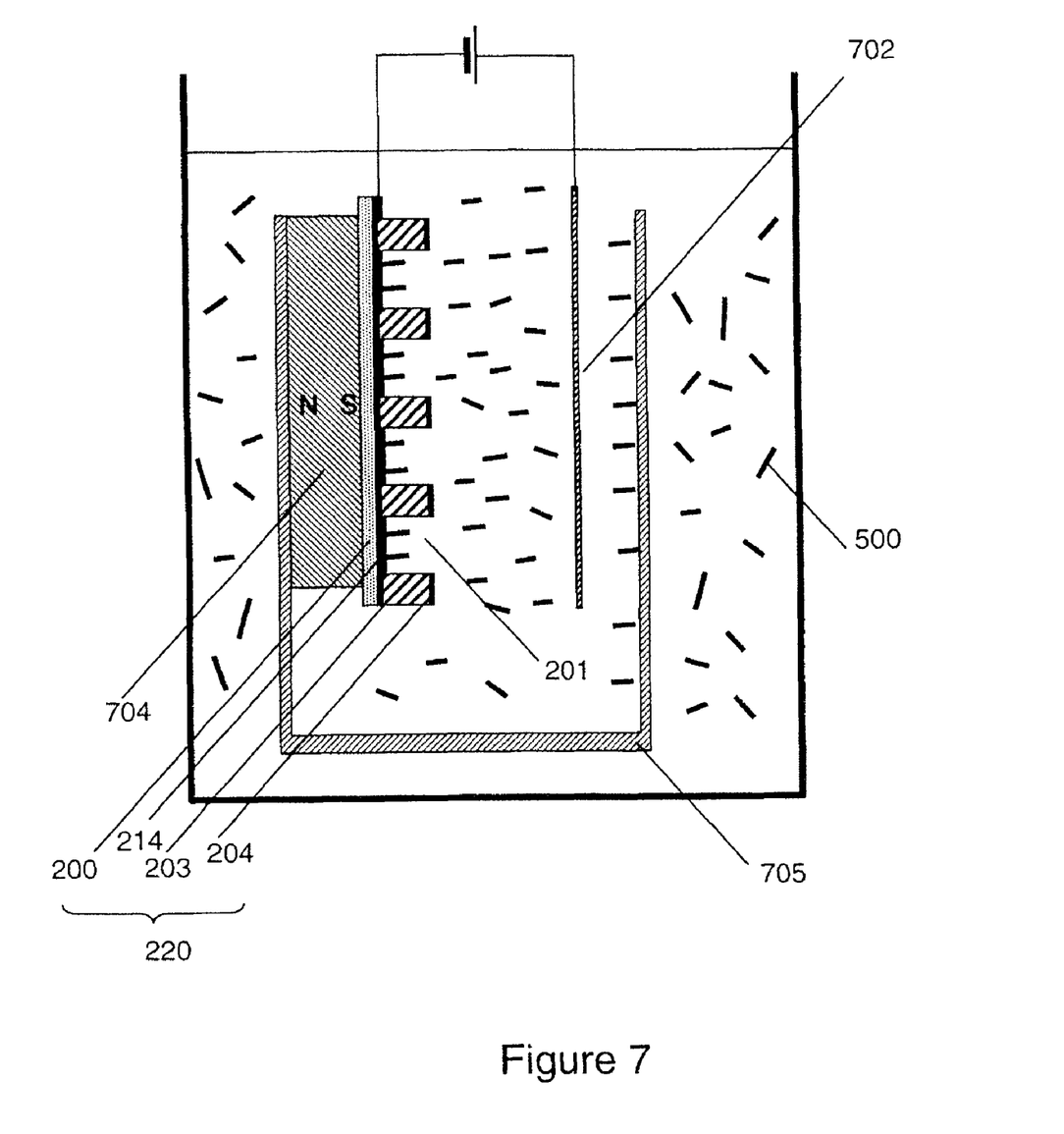
FIG. 7 is an alternative setup for the electroplating.

Secondly, the electroplating process of the embodiment will be explained. An assembly 220 having a substrate 200 with a patterned insulator layer 203, electrodes 204 and cathodes 214, is dipped in a Cu plating solution 601 which contains, for example, 200 g/L of $CuSO_4$-$5H_2O$, 50 g/L of $H_2SO_4$ and 100 mg/L of HCl. The magnetic nano-wires 500 formed by the process shown in FIG. 5 are dispersed in the plating solution. A uniform magnetic field which is generated by a magnet 604 is applied in the plating solution. The direction of the applied magnetic field is perpendicular to the substrate. Then the magnetic nano-wires which are dispersed in the solution start to align to the direction of the magnetic field. At the same time that the magnetic field is applied, an electric current is also applied between the cathode 214 and a counter electrode 602. Thus a Cu layer is deposited on the cathode layer 214 through the apertures 201 together with the Ni nano-wires. Since the Ni nano-wires align perpendicularly to the substrate in the solution, most of incorporated Ni nano-wires in the Cu film are oriented in the direction perpendicular to the major surface of the substrate (as shown in FIG. 2) It will be seen that the alignment need not be exact. All that is required is a strong correlation between the length direction of the nano-wires and the vertical direction in the figure. The difference between the above-mentioned two directions is preferably smaller than 10 degrees on average. The average difference in the direction of adjacent nano-wires is preferably no more than 5 degrees. Note that these two figures are merely averages: a small proportion of the nano-wires may fall over or incline at exceptional angles. The density of the nano-wires on the fabricated electron emitter is adjusted by optimizing the amount of dispersed nano-wires in the plating solution, the magnetic field, agitation of the plating solution and the plating current, so that the ratio S/L becomes larger than 1. This fabrication process results in a reasonable threshold voltage of field emission. The materials for the nano-wires and a metal layer do not have to be limited to Ni and Cu. Indeed both the nano-wires and the metal layer may be formed of the same material, e.g. Ni. Referring now to FIG. 7, an alternative way of performing the step of FIG. 6 is shown. A permanent magnet 704 is attached behind the substrate 200. A magnetic yoke 705 may be effective to make the magnetic field uniform. The Ni nano-wires 500 are attracted by the magnet 704 and attached on the cathode layer 214 through the apertures 201 of the insulation layer 203. The nano-wires 500 are aligned with their longitudinal direction perpendicular to the substrate. An electric current is applied between the cathode layer 214 and a counter electrode 702 at the same time. Then Cu film is deposited on the cathode 214 and the nano-wires 500 are fixed on the cathode layer 214 by the electroplated Cu film 202. The density of the nano-wires on the fabricated electron emitter is adjusted by optimizing the amount of dispersed nano-wires in the plating solution, the magnetic field, agitation of the plating solution and the plating current, so that the ratio S/L becomes larger than 1.

Figure 8:
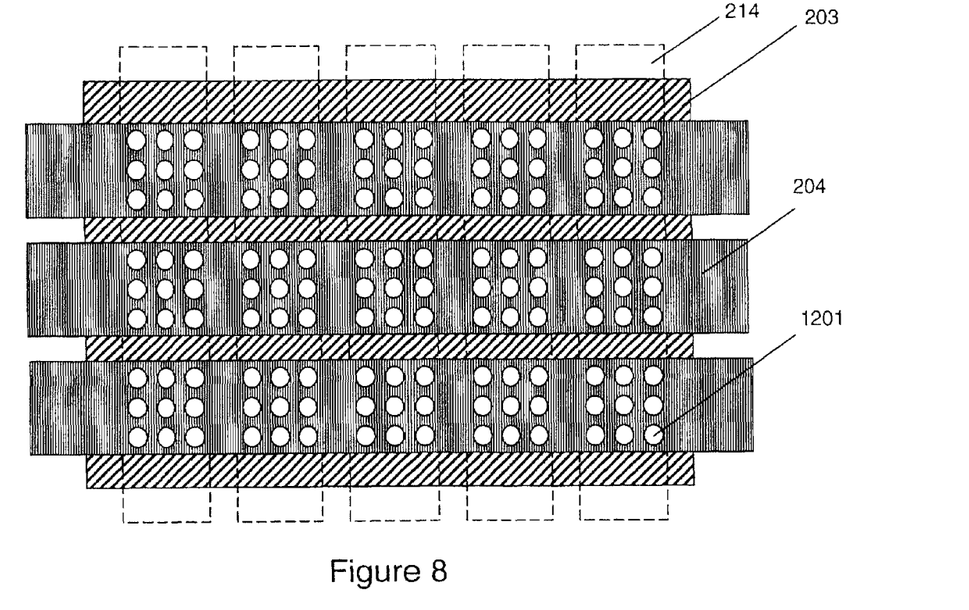
FIG. 8 is a top view of a second embodiment of the emitter array of the invention.

FIG. 8 shows a top view of a second embodiment of the emitter array 220. Reference numerals have the same meaning as in FIG. 3. This embodiment may be used also in the manner shown in FIG. 1. In contrast, to the first embodiment shown in FIG. 3, the apertures 201 are replaced by an array of smaller apertures 1201.

Figure 9:
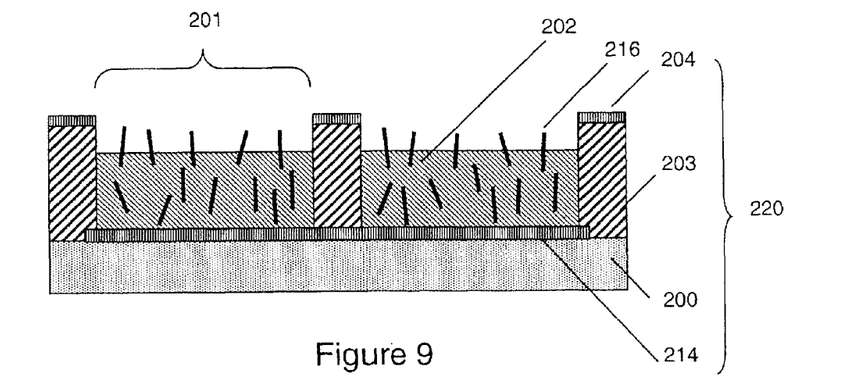
FIG. 9 is a cross sectional diagram of a third embodiment of the emitter array of the invention.

FIG. 9 is a cross-sectional view of a third embodiment of the emitter array 220. Reference numerals have the same meaning as in FIG. 2. This embodiment may be used also in the manner shown in FIG. 1. In contrast to the first embodiment shown in FIG. 2, the nano-wires 216 of the third embodiment are shorter and narrower, The upper tips of the uppermost nano-wires 216 are substantially co-planar with the gate electrodes 204.

By applying an electric field between one cathode and one gate electrode, field electron emission can be induced at the intersection of the cathode and the gate electrode selectively. Since the induced electron emission results in a local luminescence, it can be utilized for a pixel of a FED or a segment of a multi-segmented backlight for a LCD.

Figure 10:
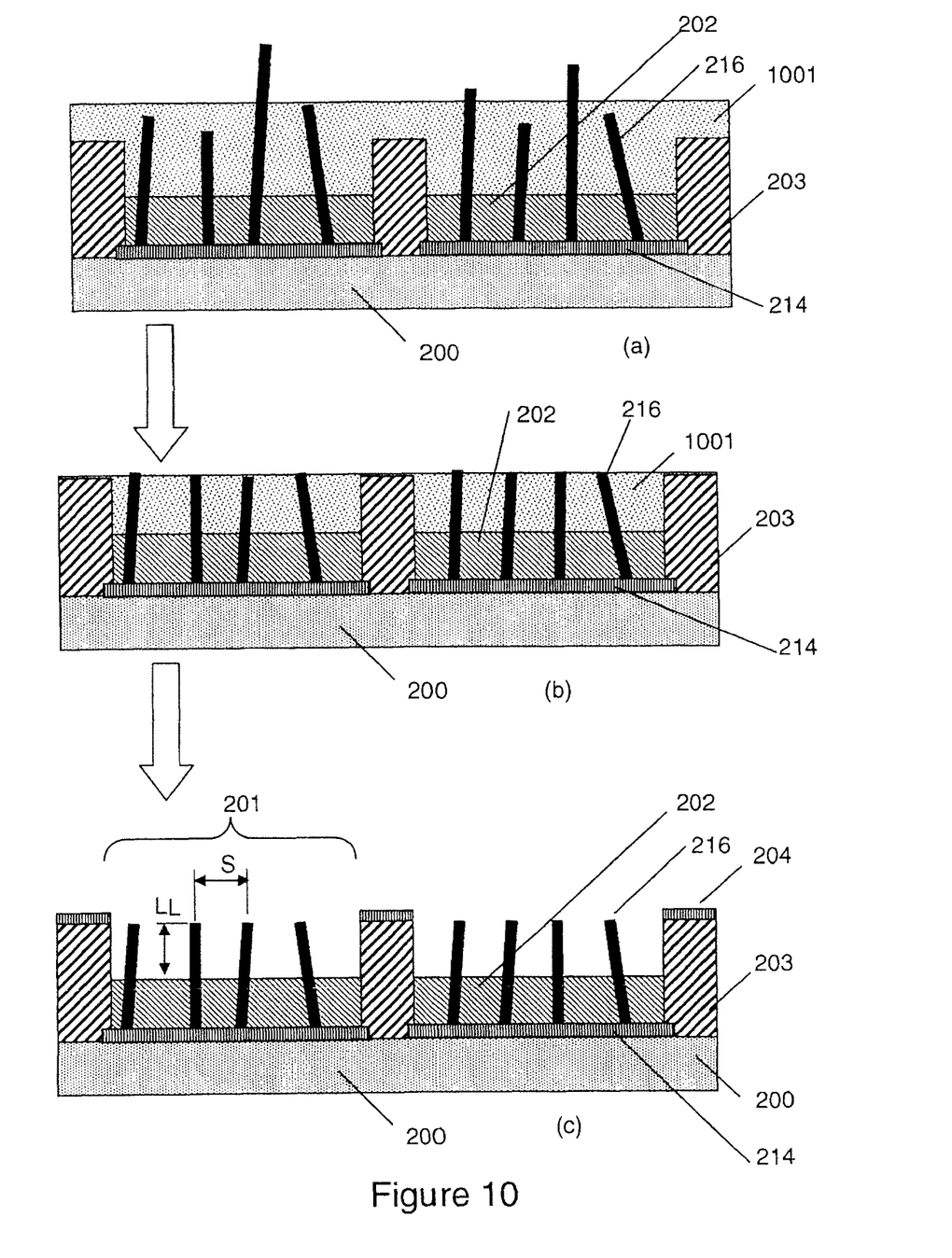
FIG. 10, which is composed of FIGS. 10(*a*) to 10(*c*), shows steps in the formation of a further embodiment of the invention.

FIG. 10 shows the production of a further embodiment of the invention. Elements which have the same meaning as the first embodiment are shown by the same reference numerals as in FIG. 2. In contrast to the first embodiment, a second metal layer 1001 deposited over the first layer 202. For example, Ni can be used for the first metal layer 202 and Cu can be used for the second metal layer 1001. The Cu of layer 1001 can be lapped or polished on a flat whetstone, to give the structure of FIG. 10(b). Then the Cu of layer 1001 can be etched selectively (e.g. by one of the suitable materials mentioned above), and then the gate electrodes 204 formed, to give the structure of FIG. 10(c).

Figure 11:
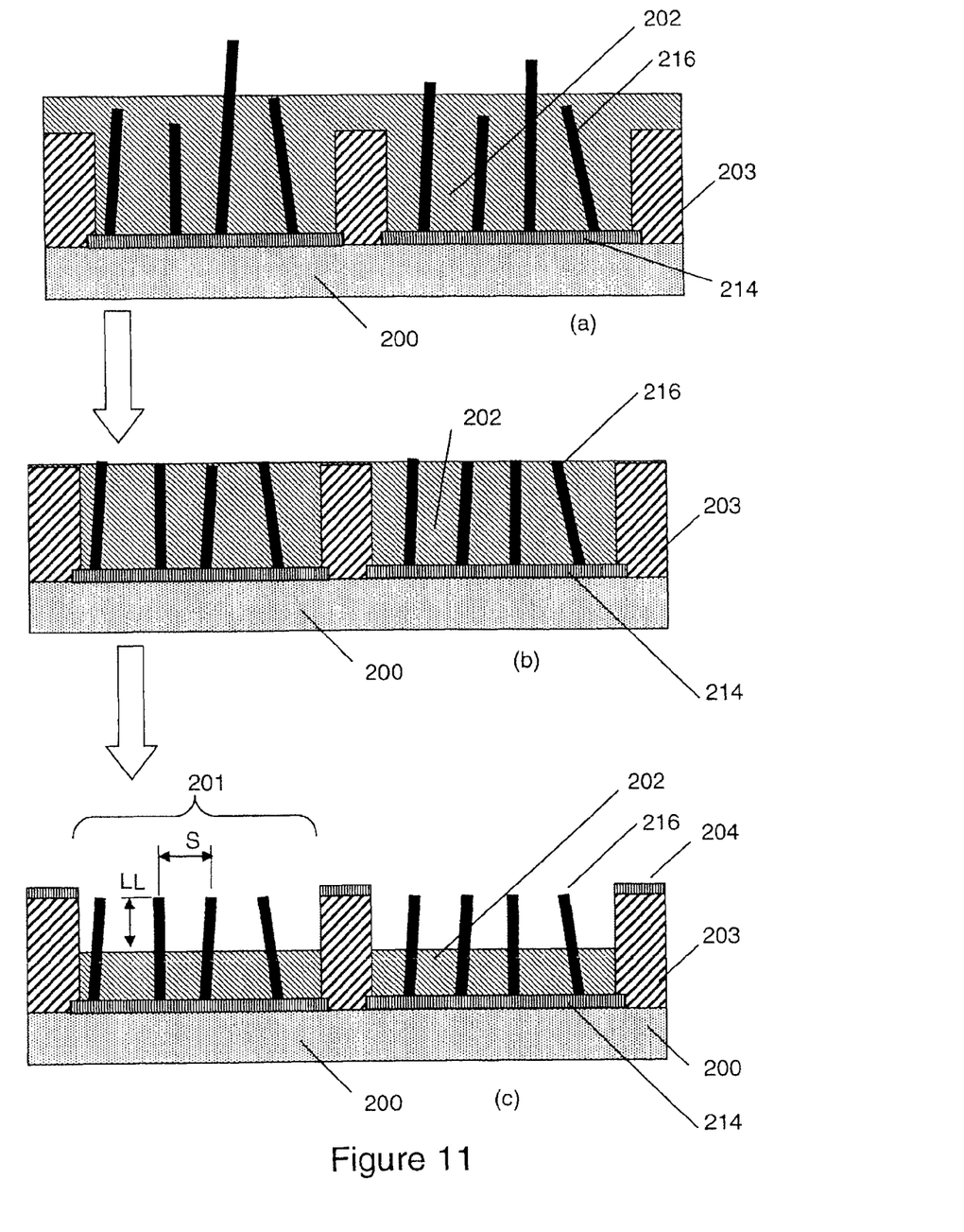
FIG. 11, which is composed of FIGS. 11(*a*) to 11(*c*), shows steps in the formation of a further embodiment of the invention.

FIG. 11 shows the production of a further embodiment of the invention. Elements which have the same meaning as the first embodiment are shown by the same reference numerals as in FIG. 2. In contrast to the first embodiment, the layer 202 is much thicker. Optionally, Ni can be used for the nano-wires 216 and Cu can be used for the metal layer 202. There is then a lapping step, to produce the structure of FIG. 11(b). Then, the Cu of layer 202 can be etched selectively (e.g. by one of the suitable solutions mentioned above) and then the gate electrodes formed, to give the structure of FIG. 11(c).

Both of the embodiments of FIGS. 10 and 11 tend to give more correlated nanowires than the first embodiment and/or the exposed length of the nanowires is more uniform.

Figure 12:
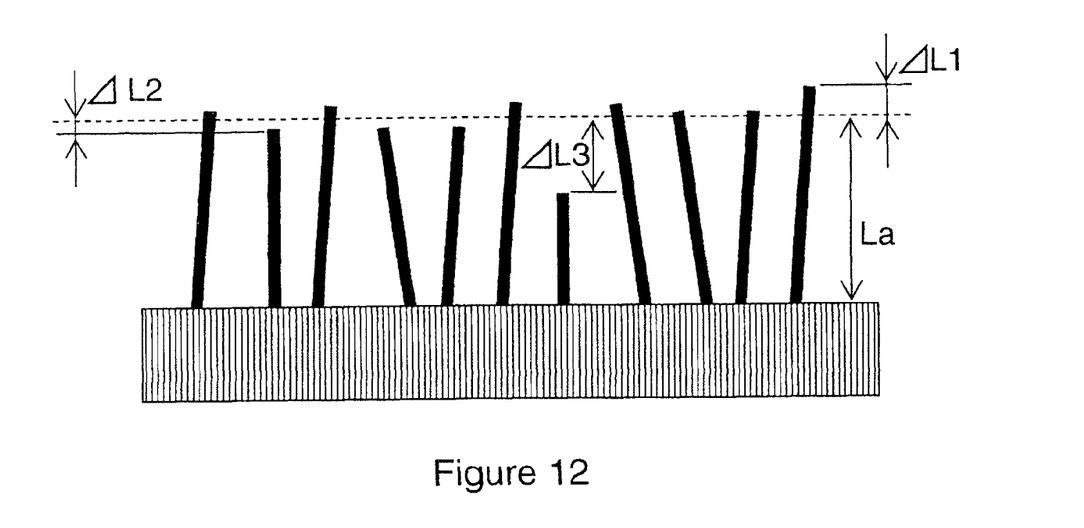
FIG. 12 shows a preferred property of all embodiments of the invention.

FIG. 12 shows a preferred property of all the embodiments explained above. Specifically, the lengths of the exposed portions of the nanowires from metal layer in which they are embedded is approximately the same. Preferably, about 90% of the nanowires are such that, their if the average exposed length of those nanowires is $L_A$ on average, the deviations ΔL1 and ΔL2 respectively above and below this average, are within 10% of $L_A$. A relatively small proportion of nano-wires have an average length which deviates from $L_A$ by an amount ΔL3 which is more than 10%. Note that when S/L=1, $(\beta_m/\beta_s)$ changes by less than 3% if the length of nano-wire fluctuates by no more than 10%. In most applications of the embodiment, a 3% change in $(\beta_m/\beta_s)$ does not affect the luminescence of the phosphor plate significantly, so a variation in average length of +10% is preferable.

REFERENCE

[1] Jean-Marc Bonard et al. "Tuning the Field Emission Properties of Patterned Carbon Nanotube Films", *Advanced Material* 2001, 13, No. 3, February 5, pp. 184-188

The invention claimed is:

1. A field effect electron emitting apparatus, comprising:
a substrate;
one or more cathodes formed on the substrate;
a metal layer in electrical contact with the one or more cathodes; and
a plurality of nano-wires embedded in said metal layer, at least a portion of each of the nano-wires being exposed from said metal layer, wherein
the nano-wires are composed of magnetic material and
the nano-wires are disposed in said metal layer to satisfy S/L>1, where L is an average of the portions of the nano-wires being exposed from said metal layer and S is an average separation S between the nano-wires.

2. An electron emitting apparatus according to claim 1, further comprising:
an insulating layer on or adjacent to the cathode and having an array of pores, and
one or more gate electrodes on top of said insulating layer.

3. An electron emitting apparatus as claimed in claim 2, wherein a nano-wire electron emitter of each nano-wire has a tip furthest from the substrate substantially co-planar with the one or more gate electrodes.

4. An electron emitting apparatus as claimed in claim 1, wherein the material of the nano-wires includes at least one of Ni, Fe, and Co.

5. An electron emitting apparatus as claimed in claim 1, wherein the material of the nano-wires is a metal or a metal oxide.

6. An electron emitting apparatus as claimed in claim 1, wherein an average diameter of nano-wire electron emitters of the nano-wires is less than 200 nm.

7. An electron emitting apparatus as claimed in claim 1, wherein there are a plurality of said cathodes, and the metal layer is partitioned into regions in electrical contact with respective ones of the cathodes.

8. An electron emitting apparatus as claimed in claim 1, wherein a length of an exposed portion of at least 90% of the nano-wires is within 10% of an average length of the exposed portion of those nano-wires.

9. A field effect display, comprising:
a field effect electron emitting apparatus as claimed in claim 1; and
a phosphor coated screen parallel to the substrate of the field effect electron emitting apparatus, the screen being provided with one or more anodes.

10. An illumination apparatus, comprising:
a field effect electron emitting apparatus as claimed in claim 1; and
a phosphor coated screen parallel to the substrate of the field effect electron emitting apparatus, the screen being provided with one or more anodes.

11. A backlight apparatus for a liquid crystal display, comprising:
a field effect electron emitting apparatus as claimed in claim 1; and
a phosphor coated screen parallel to the substrate of the field effect electron emitting apparatus, the screen being provided with one or more anodes,
wherein the one or more cathodes, gate electrodes, and/or anodes are provided with electronic circuitry to power the one or more cathodes, the gate electrodes, and/or the anodes as a plurality of independently operable segments.

12. An electron emitting apparatus as claimed in claim 1, wherein an average difference between the length direction and the vertical direction of the nano-wires is less than 10 degrees.

13. An electron emitting apparatus as claimed in claim 1, wherein an average difference between the length direction and the vertical direction of the nano-wires is less than 5 degrees.

* * * * *